Aug. 26, 1924.  1,506,378
R. D. MERSHON
OPERATING ALTERNATING CURRENT APPARATUS IN WHICH CAPACITY IS DESIRED
Filed Dec. 6, 1919  2 Sheets-Sheet 1
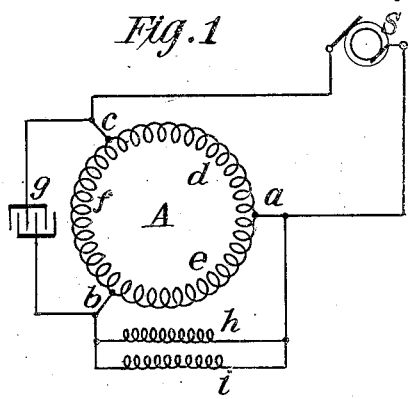
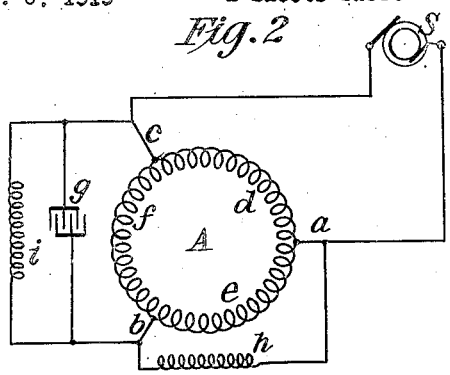
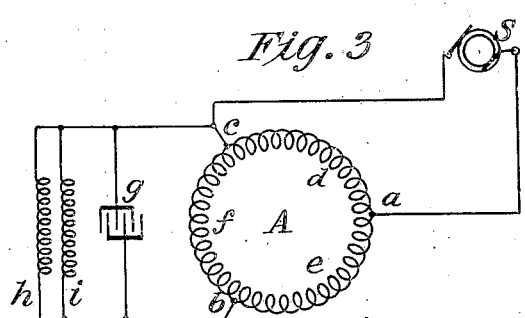
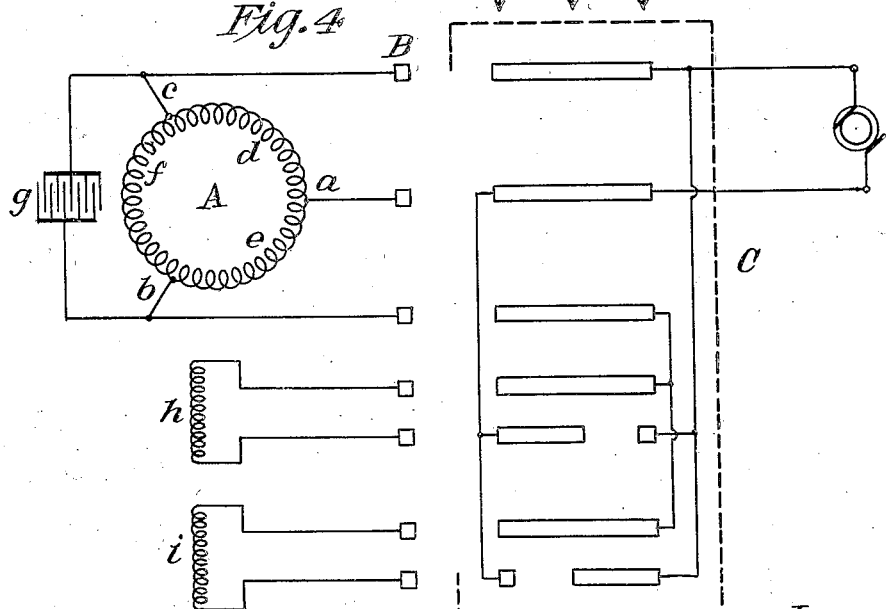
Inventor
R. D. Mershon
by his Attorneys
Kerr, Page, Cooper & Hayward Inventor
R. D. Mershon
by his Attorneys
Kerr, Page, Cooper & Hayward Patented Aug. 26, 1924.

1,506,378

UNITED STATES PATENT OFFICE.

RALPH D. MERSHON, OF NEW YORK, N. Y.

OPERATING ALTERNATING-CURRENT APPARATUS IN WHICH CAPACITY IS DESIRED.

Application filed December 6, 1919. Serial No. 343,044.

*To all whom it may concern:*

Be it known that I, RALPH D. MERSHON, a citizen of the United States of America, residing at New York, in the county and State of New York, have invented certain new and useful Improvements in Operating Alternating-Current Apparatus in Which Capacity is Desired, of which the following is a full, clear, and exact description.

In operating alternating current apparatus it is often necessary or desirable to have capacity in the circuit. For example, in operating a polyphase motor on single phase current, condensers may be used in series or in parallel with one or more parts of the motor winding and inductive reactance in one or more other parts of the winding to produce leading and lagging currents in such parts, thus converting the single phase current into polyphase. For the best results the values of the capacity and inductive reactance should not be constant but should be diminished as the load on the motor is reduced, and vice versa. Increasing or decreasing the capacity is inconvenient, however, for it involves sub-division of the condenser or condensers, with all the attendant mechanical complexities and electrical disadvantages, notably so in the case of the excited electrolytic condenser.

I have therefore been led to devise my present invention, which has for its chief object to provide a method and apparatus by which the condenser used can be left unchanged as regards both its inherent capacity and its connections to the system but can have its net or effective capacity varied at will in a simple and advantageous manner. In carrying out my invention in the preferred way I provide for each phase-winding in connection with which a leading current is desired, a single condenser of the maximum capacity needed in connection with such phase-winding in the operation of the motor, or a plurality of condensers whose capacity in sum is such maximum. For each of the phase-windings in connection with which a lagging current is desired I provide a plurality of inductive reactances. For full load conditions the condenser or condensers and all the inductive reactances are connected across or in series with their respective portions of the motor winding. Then if the load is reduced I transfer one of the inductive reactances from its phase-winding and connect it in parallel with the condenser or condensers, thus decreasing the amount of lagging current in the circuit or circuits in which lagging current is desired and decreasing the amount of leading current in the circuit or circuits in which leading current is desired. With further decrease of load another inductive reactance coil is disconnected from its phase winding and connected across the condenser or condensers, and so on through as many steps as may be necessary or desirable. Conversely, as the load increases inductive reactance is transferred from the phase-winding having the condenser or condensers to the phase-winding with which it was originally connected. The scheme thus briefly outlined is illustrated diagrammatically in the accompanying drawings, in which—

Fig. 1 shows the invention applied to a three-phase machine, with capacity and inductive reactances connected in parallel with the respective motor circuits for full load conditions.

Fig. 2 shows the system as arranged for a load somewhat less than full, and Fig. 3 for a still further decrease of load.

Fig. 4 is a diagram illustrating convenient means for making the desired changes in the connections.

In Figs. 1, 2 and 3 the motor A is provided with three taps or terminals, $a$, $b$, $c$, providing three phase-windings, $d$, $e$, $f$; terminals $a$ and $c$ being brought out for connection with a source of single phase current S. Across phase $f$ is a condenser $g$ preferably having the maximum capacity desired. Across phase $e$, Fig. 1, is a plurality of inductive reactance coils in parallel (two in the present instance) indicated by $h$ and $i$. The capacity and inductive reactance values of these devices being properly proportioned we have the desired phase difference (120° in the machine illustrated) under full load conditions. If now the load on the machine is decreased, I take inductive reactance $i$ from winding $e$ and connect it across winding $f$ in parallel with the condenser, as in Fig. 2. At the next step inductive reactance $h$ is connected across the condenser as in Fig. 3; and if desirable the inductive reactances $h$ and $i$ may have such values as to exactly nullify the condenser or to leave any desired capacity effect.

In Fig. 4 the leads $a$, $b$, $c$, and the terminals of the inductive reactances $h$ and $i$, are brought out to a row of insulated contacts B, adapted to be engaged by contacts in the switch or controller C. When the latter is shifted to its first position (when its contacts indicated by the arrow 1 are in engagement with contacts B) both inductive reactances are connected in parallel with each other across leads $a$ and $b$, as will be seen by tracing the connections. In the second position, indicated by arrow 2, reactance $h$ is left across leads $a$ and $b$ but inductive reactance $i$ is connected across leads $c$ and $b$, that is, parallel with the condenser. In the third position, indicated by arrow 3, both inductive reactances are connected in parallel with each other and with the condenser. The condenser effect in connection with winding $f$ is thus reduced by successive steps or stages, as many inductive reactance coils and therefore as many steps being provided as may be desirable. Conversely the condenser effect may be progressively increased by disconnecting the inductive reactances in succession from the leads $c$ and $b$ and connecting them with leads $a$ and $b$. At the same time it is unnecessary to make any changes in the connections of the condenser, the latter being left across leads $b$ and $c$ at all times.

Figure 5:
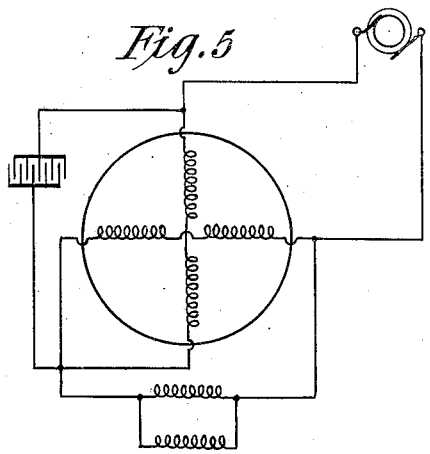
Fig. 5 is a diagram illustrating full-load parallel connections in a two-phase machine having open coil windings.
Figure 6:
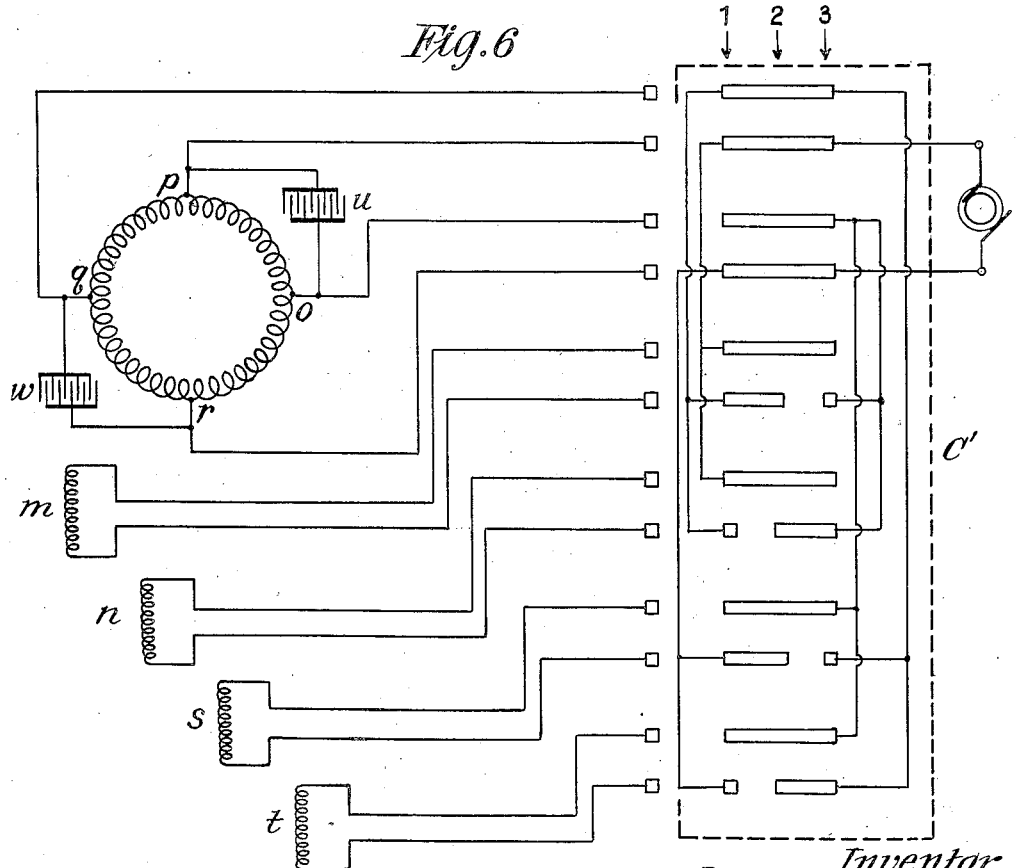
Fig. 6 shows the invention applied to a two-phase machine having a closed coil winding, with a switch or controller for shifting the connections at will.

In a two-phase machine having separate phase-windings the condenser and inductive reactances can be connected as in Fig. 5, which shows the arrangement for full load. In a two-phase machine having a continuous or closed-coil winding the connections may be as in Fig. 6, which shows a switch or controller C′ for shifting the connections of the inductive reactance coils at will. Upon tracing the circuits it will be seen that in the first position of the controller inductive reactances $m$, $n$ are connected across leads $p$ and $q$, and inductive reactances $s$, $t$ across leads $r$ and $o$. In the second position inductive reactance $n$ is put across the condenser $u$ and inductive reactance $t$ across condenser $w$, the others remaining as before. In the third position inductive reactance $m$ is put across condenser $u$, in parallel with inductive resactance $n$, and $s$ is put across condenser $w$, in parallel with inductive reactance $t$.

Figure 7:
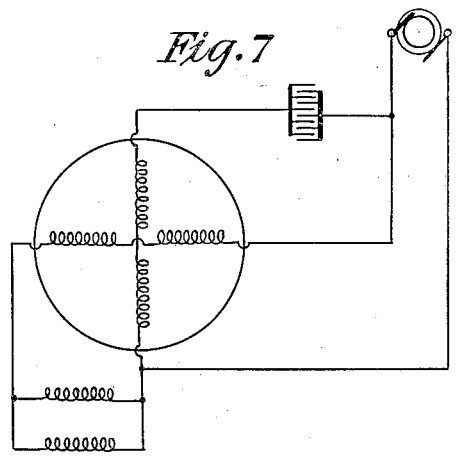
Fig. 7 is a diagram showing series connection of the capacity and inductive reactance with the respective phase-windings, for full load conditions.

In Fig. 7 I have shown a motor (two-phase, with open-coil windings, but intended to represent any polyphase motor of any number of phases and any type of winding) in which the capacity and inductive reactance used are in series with the respective windings. As the load decreases, inductive reactance is taken from its connection for full load and connected in parallel with the condenser.

It will be seen from the foregoing that my invention provides a convenient and effective method of obtaining a variable condenser effect in connection with a circuit without varying or subdividing the condenser itself. Moreover, it may happen that where a condenser or capacity effect is desired in a circuit it may be impossible or greatly inconvenient, under the circumstances, to obtain exactly the capacity needed, but on the other hand, inductive reactance coils are easily made or adjusted to any desired value or values. In such case it is only necessary to provide a condenser or condensers having a total capacity greater than that required, and then connect in parallel therewith sufficient inductive reactance to leave effective the desired amount of capacity. In short the effective capacity of the condenser is adjusted without adjusting or changing the condenser itself.

It is to be understood that the invention is not limited to the specific apparatus herein described but may be used in other apparatus without departure from its spirit.

I claim:

1. In the art of operating on a single phase circuit a polyphase motor having a condenser connected with a phase-winding thereof, the improvement comprising connecting inductive reactance with another phase-winding of the motor for operation under a given load, and as the load is decreased transferring inductive reactance from the latter phase-winding to the former to decrease both the effective capacity and the effective inductive reactance in connection with such phase-windings without change in the condenser.

2. In the art of operating on a single phase circuit a polyphase apparatus having a condenser connected with a phase-winding thereof, the improvement comprising operating under full load with a plurality of inductive reactances connected with another phase-winding, and as the load decreases transferring inductive reactances in succession from the latter phase-winding to the former to decrease both the effective capacity and the effective inductive reactance in connection with such phase-windings without change in the condenser.

3. The combination with an alternating current apparatus having phase-windings, of a condenser connected with a phase-winding thereof, a plurality of inductive reactances connected with another phase-winding, and means for transferring inductice reactances in succession from the latter phase-winding to the former.

4. The combination with a polyphase alternating current motor, of a condenser connected with a phase-winding of the motor, inductive reactance connected with another phase-winding, and means for transferring inductive reactance from the latter phase-winding and connecting it in parallel with the condenser.

In testimony whereof I hereunto affix my signature.

RALPH D. MERSHON.